US011358666B2

United States Patent
Radenbaugh (10) Patent No.: US 11,358,666 B2
(45) Date of Patent: Jun. 14, 2022

(54) ADJUSTABLE SEAT ACCESSORY

(71) Applicant: Rad Power Bikes Inc., Seattle, WA (US)

(72) Inventor: Mike Radenbaugh, Seattle, WA (US)

(73) Assignee: RAD POWER BIKES INC., Seattle, WA (US)

( * ) Notice: Subject to any disclaimer, the term of this patent is extended or adjusted under 35 U.S.C. 154(b) by 152 days.

(21) Appl. No.: 16/775,017

(22) Filed: Jan. 28, 2020

(65) Prior Publication Data

US 2020/0239095 A1    Jul. 30, 2020

Related U.S. Application Data (60) Provisional application No. 62/798,714, filed on Jan. 30, 2019.

(51) Int. Cl.
*B62J 7/04* (2006.01)
*B62J 25/04* (2020.01)
(Continued)

(52) U.S. Cl.
CPC . *B62J 7/04* (2013.01); *B62J 1/08* (2013.01); *B62J 25/04* (2020.02); *B62M 6/40* (2013.01);
(Continued)

(58) Field of Classification Search
CPC ....... B62J 7/04; B62J 25/04; B62J 1/08; B62J 2001/085; B62J 1/00; B62J 1/12; B62J 1/28; B62M 6/40; B62K 13/00
See application file for complete search history.

(56) References Cited

U.S. PATENT DOCUMENTS 4,786,070 A * 11/1988 Adee ................... B62K 15/006
                                                          280/288.1
6,149,177 A * 11/2000 Valdez ..................... B62J 25/00
                                                          280/291

(Continued)

FOREIGN PATENT DOCUMENTS

EP          3309047      * 11/2016
EP          3309047 A1    4/2018
(Continued)

OTHER PUBLICATIONS

Anonymous: "Companion Bike Seats—?? I Facebook", Mar. 3, 2018 (Mar. 3, 2018), XP055831115, Retrieved from the Internet: URL:https://zh-cn.facebook.com/pg/CompanionBikeSeat/posts/?ref=page_internal Yetrieved on Aug. 10, 2021].

(Continued)

*Primary Examiner* — Minnah L Seoh
*Assistant Examiner* — Marlon A Arce
(74) *Attorney, Agent, or Firm* — AMPACC Law Group, PLLC (57) ABSTRACT

A bicycle seat accessory that includes an adjustable seat and a rear seat accessory to provide a seating surface for a user and a rider or passenger. The adjustable seat is movable between a first and second position and when in the second position, the seating surface of the seat substantially aligns with the seating surface of the rear seat accessory to form a substantially continuous seating surface. The frame of the bicycle includes an accessory shelf onto which the rear seat accessory can be mounted. Additionally, the frame includes one or more brackets to which footpeg accessories can be mounted to provide foot rests for the passenger of the bicycle while seated on the rear seat accessory.

21 Claims, 9 Drawing Sheets

(51) Int. Cl.
*B62J 1/08* (2006.01)
*B62M 6/40* (2010.01)
*B62J 1/00* (2006.01)
*B62K 13/00* (2006.01)
*B62J 1/12* (2006.01)
*B62J 1/28* (2006.01)

(52) U.S. Cl.
CPC .. *B62J 1/00* (2013.01); *B62J 1/12* (2013.01); *B62J 1/28* (2013.01); *B62J 2001/085* (2013.01); *B62K 13/00* (2013.01)

(56) References Cited

U.S. PATENT DOCUMENTS

| | | | | |
|---|---|---|---|---|
| 7,828,313 | B1* | 11/2010 | Cienfuegos | B62K 19/36 |
| | | | | 280/281.1 |
| 2019/0315423 | A1* | 10/2019 | Usui | B62L 3/00 |
| 2020/0130769 | A1* | 4/2020 | Zona | B62K 15/008 |

FOREIGN PATENT DOCUMENTS

| | | |
|---|---|---|
| JP | 4297384 B1 | 7/2009 |
| NL | 1022865 C2 | 9/2004 |

OTHER PUBLICATIONS

Examination Report dated Aug. 13, 2021 for related European patent Application No. 20154305.5-1009.
European Search Report and Search Opinion for European Patent Application No. 20154305.5 dated May 7, 2020.

* cited by examiner

ADJUSTABLE SEAT ACCESSORY

CROSS-REFERENCE TO RELATED APPLICATIONS

This patent application claims the benefit of and priority to U.S. Provisional Patent Application Ser. No. 62/798,714, filed on Jan. 30, 2019, and entitled, "ADJUSTABLE SEAT ACCESSORY," the disclosure of which is hereby incorporated by reference in its entirety.

BACKGROUND

Bicycles are becoming an increasingly accepted and adopted transportation option. With current technology, electric bicycles are becoming more widely available and a more popular option, or type, of bicycle for use in transportation. Electric bicycles can assist a rider with propelling the bicycle and/or can provide the total propulsion of the bicycle. As electric bicycles become more and more popular, accessories that increase the usability and/or comfort of the bicycle are needed. These may serve to increase both the adoption and utility of the bicycle, particularly for some users.

DETAILED DESCRIPTION OF THE EMBODIMENTS

An example bicycle seat accessory and an example storage accessory are described herein. Each of the accessories can be mounted to a bicycle using mounting hardware and one or more attachment points of the frame of the bicycle. An adjustable seat of the bicycle can be moved or changed between a raised, or first, position and a lowered, or second, position. A seat accessory can be installed on a rear shelf, or frame, of the bicycle, such that the seat accessory and seat align when the seat is in the lowered, or lowest, position. With the seat and seat accessory aligned, a user/driver and rider, or passenger, can comfortably sit on the substantially continuous seating surface. The bicycle can be an electric bicycle that a user can operate in a manual, or pedal, mode with the seat raised in a comfortable position for doing so (and provide the user with greater leverage on the pedals). To control propulsion of the bicycle using an electric motor, the user can actuate a throttle. The user can actuate the throttle at any time during use of the bicycle to engage the electric motor to propel, or assist in propelling, the bicycle. In an operating mode that includes assistance, the electric motor can operate in coordination with the pedaling of the user to propel the bicycle. When the seat is in the lowered arrangement or position, it may be uncomfortable for the user to operate the pedals, so the user can operate the bicycle in a self-propelled mode in which the user controls the speed of the bicycle by operating the throttle control. As such, when the user and rider are riding the bicycle with the seat accessory and seat aligned, the operation of the bicycle in the self-propelled mode can provide a more comfortable experience for both the user and rider. In embodiments that include a storage accessory, the accessory/compartment can have a weatherproof, and/or waterproof, interior that protects contents stored within from the external environment. The interior of the storage accessory can be protected from unauthorized access by a locking element or mechanism that secures the storage accessory.

Figure 1:
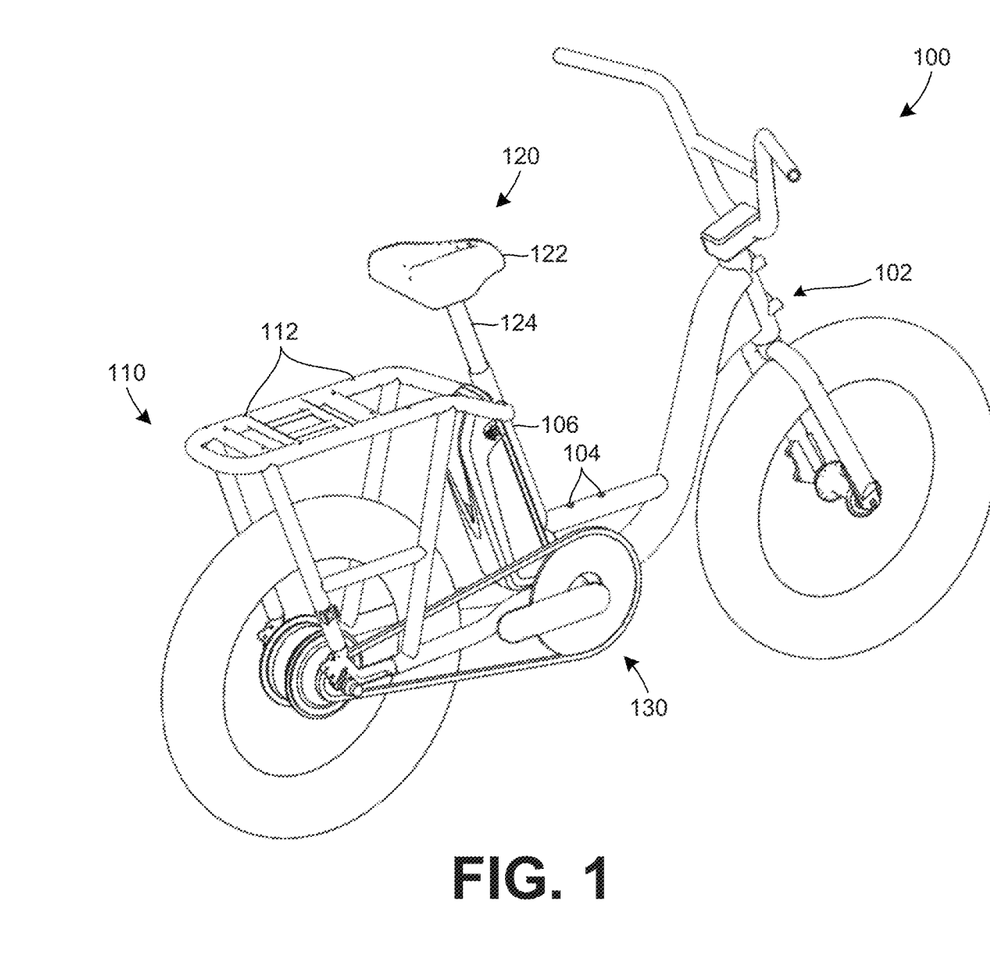
FIG. 1 illustrates a bicycle having an example adjustable seat in a first position.

FIG. 1 shows a bicycle 100 having a frame 102 to which various elements, features and/or accessories can be affixed, attached and/or connected. The frame 102 includes a section 110 that is an accessory shelf. The accessory shelf 110 includes various attachment points 112 that can be used to attach one or more accessories to the shelf 110. In an example, the attachment points 112 can be threaded to allow screws, or other threaded fasteners, to be used to affix items, such as an accessory, to the accessory shelf 110. In another example, the attachment points can be openings through which a fastener, such as a bolt and nut, can be passed through and secured. Alternatively, other securing elements, such as a rope or elastic cords, can be passed through and/or secured to the attachment points 112. Accessories, and/or other items, can be secured releasably, semi-permanently, or permanently to the accessory shelf 110 using the attachment points 112.

In another embodiment, intermediate fastening elements, such as a quick, or easy, release fastener, can be affixed to the attachment point(s) 112. The intermediate fastener can be affixed to the accessory shelf by the attachment points 112 and can allow an accessory to be quickly and/or easily attached and released from the intermediate fastener. An accessory can interface with the intermediate fastening element(s) to allow a user to easily and quickly attach and release an accessory from the accessory shelf 110 using the intermediate fastener(s).

The frame 102 can also include other attachment points 104 to which other accessories can be fitted. The distribution of attachment points 104 on the frame 102 allows for multiple accessories to be mounted to the bicycle 100, such as storage, lighting, electronics, controls, safety and/or other accessories. In this way a user can customize and/or alter the features/functions of the bicycle 100 as needed or desired for different uses or tasks.

A seat 120 for the user is also included on the bicycle 100. The seat 120 includes a seating portion 122, on which the user sits, and a seat post 124 that is connected to, or integrated with, the seating portion 122. The position of the seat 120 can be adjusted by varying the amount of seat post 124 extended from the seat tube 106 of the frame 110.

A quick release clamp can be used to secure the position of the seat 120 and allow the user to quickly and easily adjust the position, or height, of the seat 120 relative to the frame 102. Other suitable means of securing the position or height of the seat 120 can also be used. In one embodiment, the quick release clamp is a component of the seat 120. In another embodiment, the quick release clamp is a component of the frame 102, though more specifically the seat tube 106.

In the example shown in FIG. 1, the seat 120 is shown in a first, or raised, position corresponding to a typical height for a user to comfortably and/or efficiently use the pedals 130 of the bicycle 100. The height of the seat 120 can be relative, or dependent, on the size of the user and can be adjusted based on the user's comfort when using the pedals 130 to propel, or assist in propelling, the bicycle 100. In an example, the seat 120 can be positioned at a height to allow the user to comfortably pedal the bicycle 100 using the pedals 130 and/or to increase, or maximize, the efficiency of the user's power input to the bicycle 100.

The example bicycle 100 of FIG. 1 is an electric bicycle that includes a power source and motor to assist a user in propelling the bicycle 100. To propel the bicycle 100, a user can pedal using the pedals 130 and/or a throttle (not shown). Accordingly there are one or more operating modes of the bicycle 100; a manual mode, an assisted mode and/or a self-propelled, or powered, mode. In the manual operating mode, a user pedals the bicycle 100 using the pedals 130, substantially similar to using a typical conventional bicycle. In the assisted mode, a user pedals the bicycle 100 using the pedals 130 and is aided by an electric motor of the bicycle 100. In this manner, the power imparted to propelling the bicycle 100 is a combination of user-provided power via the pedals 130 and power provided by the electric motor of the bicycle 100. The amount of assistance imparted by the electric motor can be manually varied, such as by the throttle or other user input or control, or can be automatically varied, such as by a control system of the electric motor and/or bicycle 100. In the self-propelled mode, the user is not required to use the pedals 130; instead, the electric motor provides the requisite power to propel the bicycle 100. In this mode, the user can actuate a throttle to adjust the power provided by the electric motor and/or speed of the bicycle 100 and the operation of the bicycle 100 by the user can be substantially similar to the operation of an electric scooter or motorcycle.

With the seat 120 in the first position, such as shown in FIG. 1, a user of the bicycle 100 can propel the bike in a manual, assisted, or self-propelled mode by use of the pedals 130 and/or a throttle (not shown). During pedaling and/or coasting of the bicycle 100, energy due to motion of the pedals and/or wheels of the bicycle can be captured, or recaptured, and stored as electrical energy in a battery, or other form of storage for energy. This energy capture/recapture, such as by a generator and/or regenerative braking components, can allow the user to extend the usable range and/or time of the electric assistance and/or propulsion of the bicycle 100. In one embodiment, the energy capture system(s) can be selectively and/or automatically activated to capture, or recapture, energy for storage in the battery. In another embodiment, the automatic activation of the energy capture/recapture system can be in response to detecting that the seat 120 has been lowered.

Figure 2:
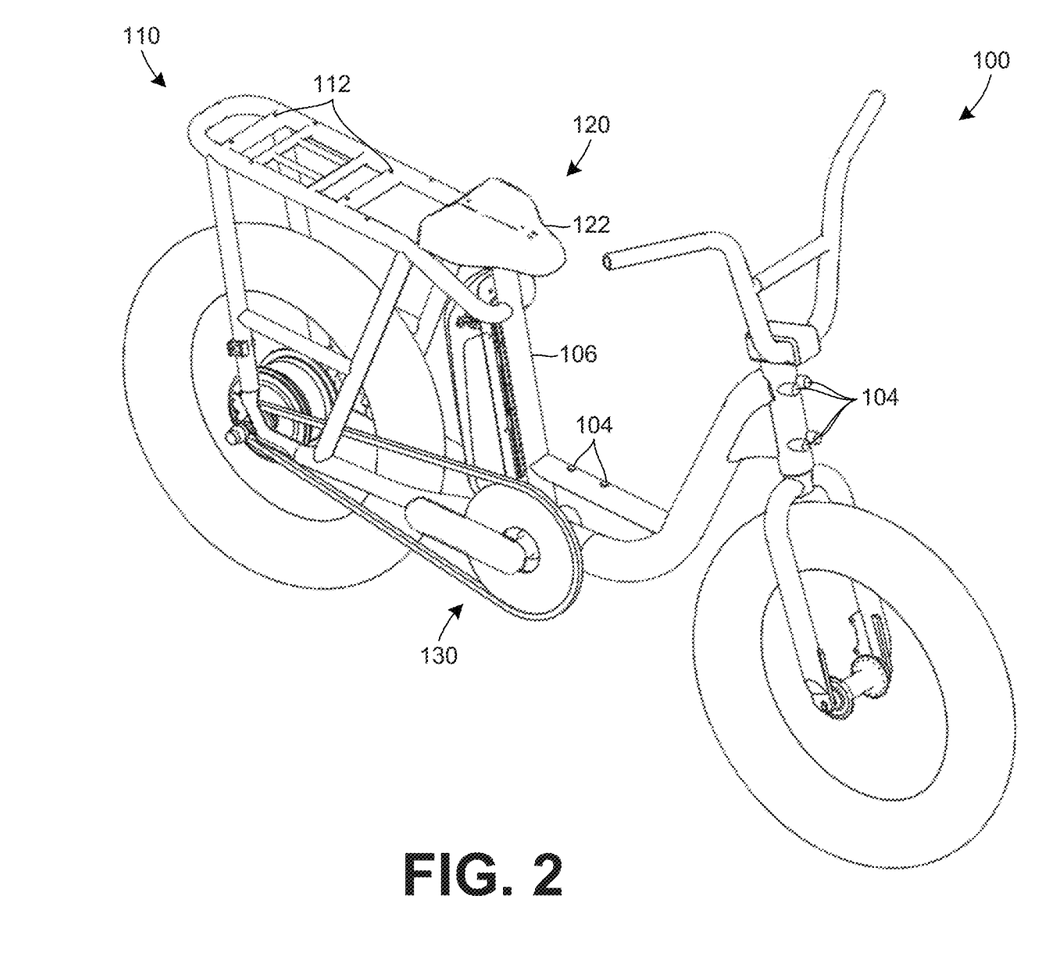
FIG. 2 illustrates the bicycle having the example adjustable seat in a second position.

FIG. 2 shows the bicycle 100 with the seat 120 in a second, lowered, position. In the second position, the seat 120 is resting on, or is proximal to, the accessory shelf 110. This second position is a lower position than the first position and can be the lowest possible position for the seat 120. With the seat 120 positioned at the second position, a user may still be able to use the pedals 130 to propel the bicycle 100, however, the user's comfort of doing so may be diminished in comparison with their comfort with the seat 120 in the first position. Additionally, the second position may have reduced efficiency, and/or increased fatigue, associated with the user using the pedals 130 while seated on the seat 120.

In the second position, the seat 120 may be more comfortable for the user when operating the bicycle 100 in the self-propelled mode, such as when the propulsion of the bicycle 100 is provided in part or wholly by the electric motor. While seated on the seat 120 in the second position, a user can rest their feet on the pedals or foot rests (not shown) while actuating the throttle and brakes to control the speed of the bicycle while operating the bicycle 100 using the electric motor, or drive.

To move the seat 120 from a position, such as the first position, to the second position, a user can actuate the quick release (or other form of release mechanism) associated with the seat post to allow the seat 120 to be moved between the positions. Alternatively, the seat post, and/or another element or system, can allow, or assist with, movement of the seat 120 between positions automatically, or in an assisted mode (such as by integration of a hydraulic component), in response to a user input. That is, the seat 120 can be coupled to an element or system, such a dropper seat post, to allow a user to selectively lower and/or raise the seat 120 in response to a user input. Such a system allows the user to easily adjust the position of the seat 120, such as from the first to the second position.

In an example embodiment, the positioning of the seat 120 in the second position can cause an activation, change and/or configuration of the bicycle and/or its systems/elements/features. Such a change in seat position can be registered and/or detected by one or more systems and/or elements of the bicycle 100, such as a sensor and/or control system. The detection, sensing, and/or registration of the change in seat position can cause the activation, change and/or configuration of the bicycle 100 to occur. For example, the change in seat 120 position can cause an operating mode of the bicycle 100 to change, such as from the manual, or assisted, mode to the self-propelled mode. In another example, the change in seat 120 position can activate a system of the bicycle, such as a lighting system that includes a brake light. Various other systems, features and/or elements of the bicycle 100 can be activated, changed, configured and/or reconfigured in response to a change in the position of the seat 120.

Note that other and/or alternative systems of the bicycle 100 can be reconfigured, configured, activated and/or deactivated in response to movement of the seat 120 from one position to another. In another example, movement of the seat 120 to the second position can cause a lighting system of the bicycle 100 to become activated and/or reconfigured. In this example, positioning the seat 120 in the second position can cause a front and/or rear light, or light signaling system, to be activated and/or reconfigured, such as activation of a rear light to function as a braking light. Although not certain, it may be assumed that the user will operate the bicycle 100 in a self-propelled mode when the seat 120 is in the second position and a lighting system of the bicycle 100 can be configured and/or activated to support operation of the bicycle 100 in the self-propelled mode.

Figure 3:
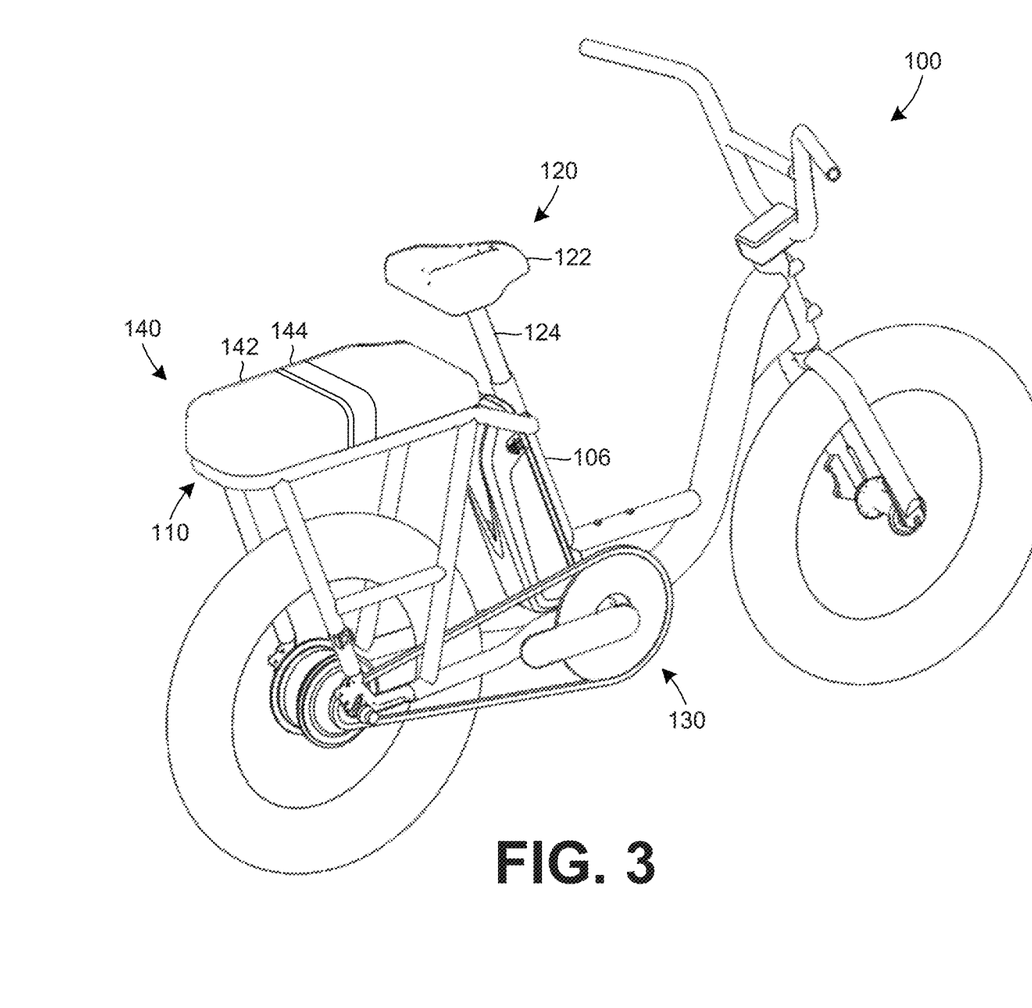
FIG. 3 illustrates the bicycle having the adjustable seat in the first position and an example seating accessory.

FIG. 3 illustrates the bicycle 100 with a rear seat accessory 140 installed onto the accessory shelf 110. The rear seat accessory 140 includes a seating surface 142, on which a rider can sit while being transported by a user using the bicycle 100. The seating surface 142 is profiled and has a rear portion that is higher or thicker than a front portion which abuts the seat 120. The higher rear portion allows the rider, such as a passenger, to have an elevated or raised seating position. In an example, the raised seating position can allow the passenger to have a sightline over the user of the bicycle 100. An attachment element, such as a bolt or screw, and the attachment points 112 (not shown) can be used to secure the rear seat accessory 140 to the accessory shelf 110. The installation of the rear seat accessory 140 to the accessory shelf 110 can be a releasable, semi-permanent, or permanent attachment.

The rear seat accessory 140 can include a strap 144 going across the seating surface 142. The strap 144 can be grasped by a rider sitting on the rear seat accessory 140 to assist them with maintaining their position on the rear seat accessory 140. Additionally, or alternatively, the strap 144 can be used to a secure small item(s) to the rear seat accessory 140 by securing the item(s) between the strap 144 and the seating surface 142. In the example shown in FIG. 3, the strap 144 is integrated with, or attached to, the rear seat accessory 140. In an alternative embodiment, the strap 144 can have one or both ends releasably connected, or coupled, to the rear seat accessory 140. Additionally, the strap 144 can include additional material, and/or elements, to allow a length of the strap 144 to be varied, such as elongating or shortening the strap 144.

In the example shown in FIG. 3, the seat 120 is shown in the first, or an upper, position. With the seat 120 at this position, the seating portion 122 of the seat 120 and the seating surface 142 of the rear seat accessory 140 are not aligned. In this arrangement a rider and a user can both be seated, one on the rear seat accessory 140 and the other on the seat 120, however, it may be an uncomfortable, or less than optimal, arrangement for two people to be riding on the bicycle 100.

Figure 4:
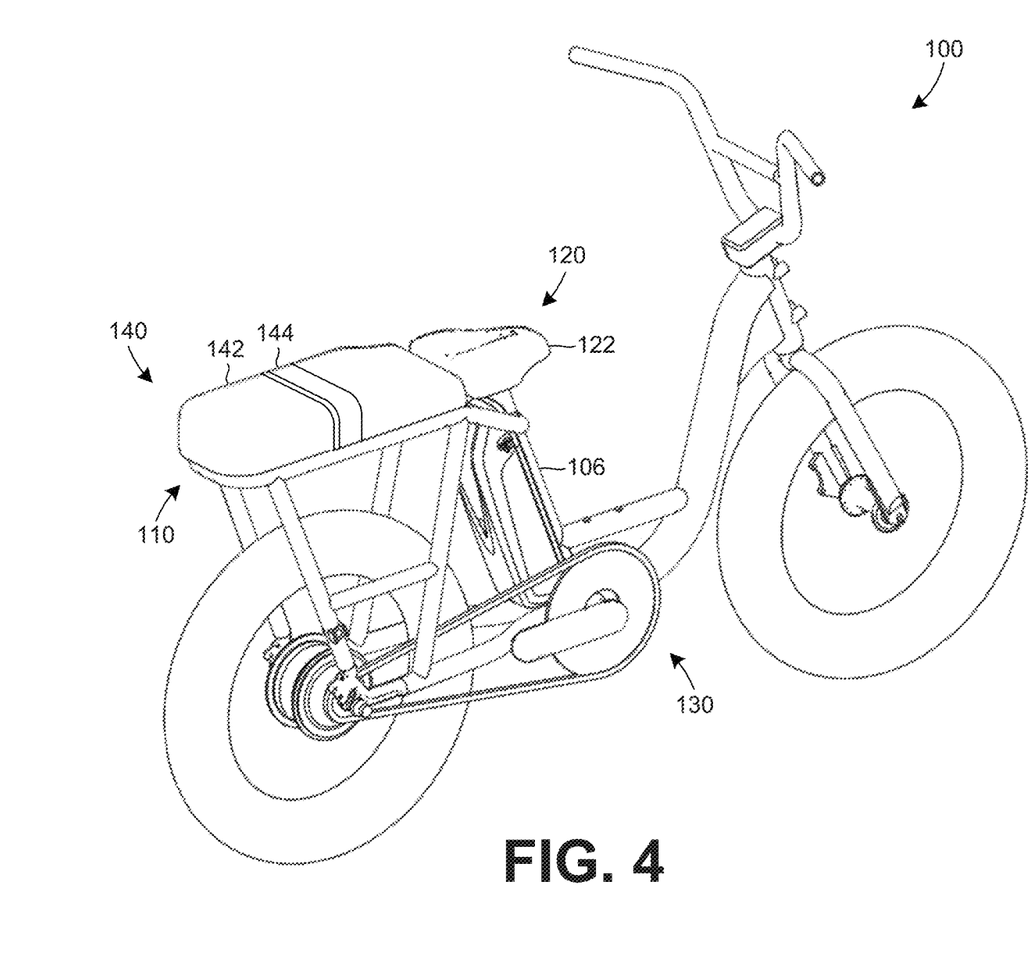
FIG. 4 illustrates the bicycle having the adjustable seat in the second position and the example seating accessory.

FIG. 4 illustrates the bicycle 100 having the rear seat accessory 140 and the seat 120 in the second, lowered, position. In this arrangement, the rear seat accessory 140 and seat 120 can form a substantially continuous seating element/surface, since at least a portion of the seating surface of 142 of the rear seat accessory 140 is substantially aligned with the seating portion 122 of the seat 120. With the seat 120 in this position, aligned with the rear seat accessory 140, the two elements can provide a more comfortable and/or optimal arrangement for the rider and user in comparison with the example of FIG. 3.

In the configuration shown in FIG. 4, the bicycle 100 can operate in any mode, however, the self-propelled operation mode may be a more comfortable mode of operation due to the lowered seat 120 height relative to the pedals 130. A user and rider can be seated on the seat 120 and rear seat accessory 140, respectively, while the user operates the bicycle 100 in the self-propelled mode. In such operation, both the user and/or rider can rest their feet on foot support accessories, such as foot rests, running boards or pegs or other elements, and/or the pedals 130, while propulsion of the bicycle 100 is controlled via a user operated throttle control.

Figure 5A:
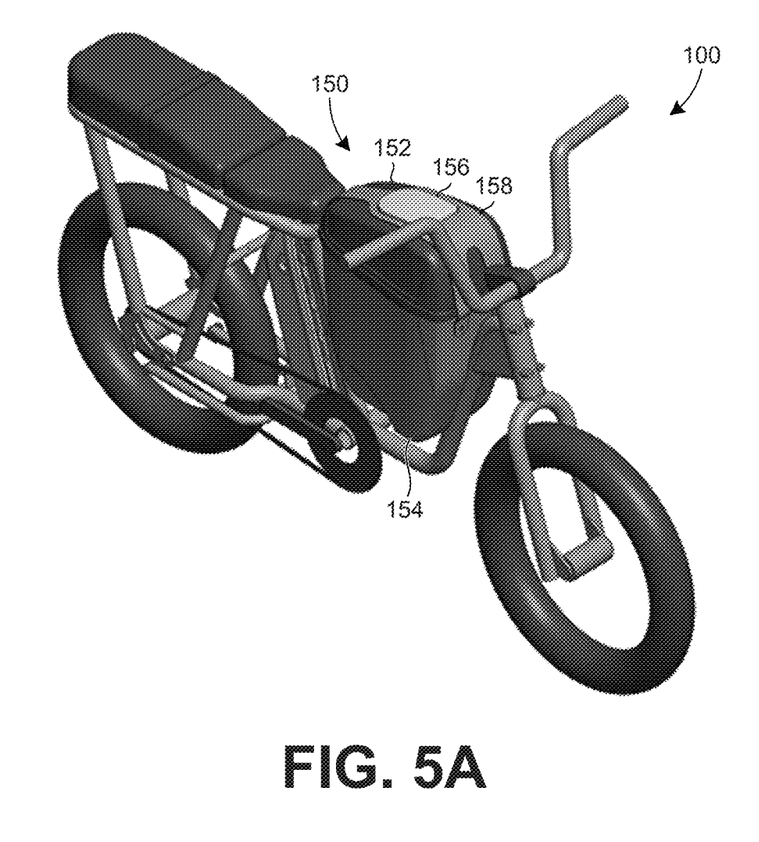
FIGS. 5A-5B illustrates the bicycle having an example storage accessory.
Figure 5B:
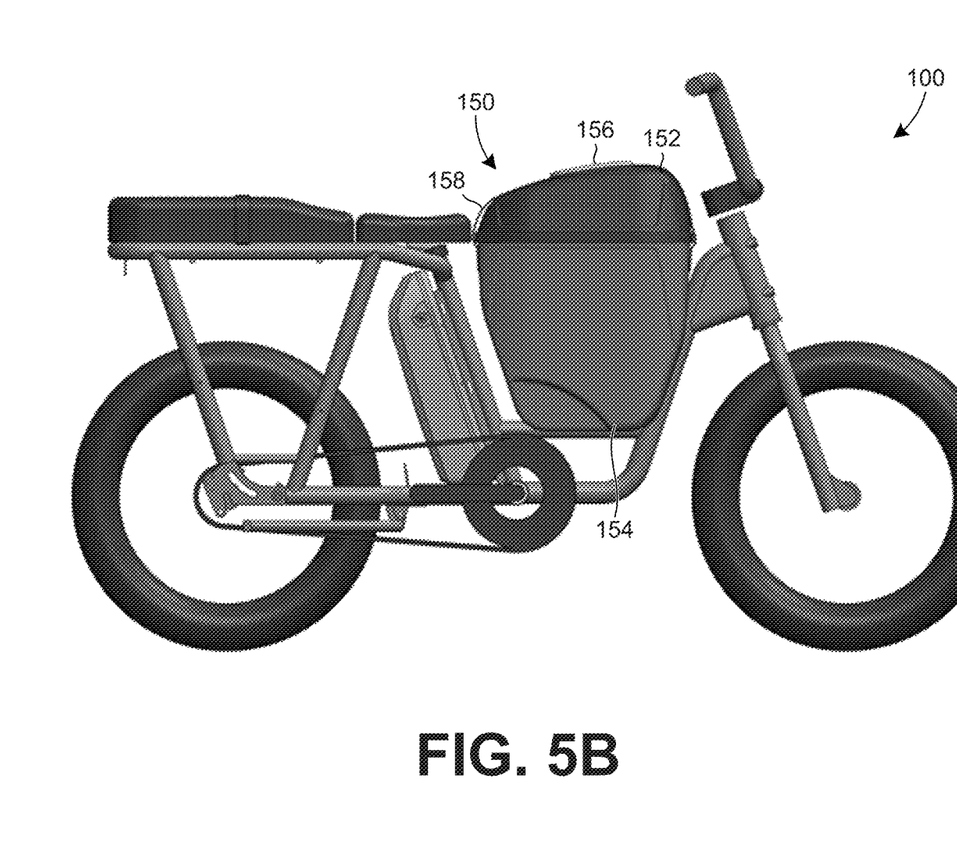

FIGS. 5A-5B illustrate the bicycle 100 with an example storage accessory 150. The storage accessory 150 can be attached to the frame of the bicycle 100 using one or more attachment points, such as 104 of FIG. 1. The storage accessory 150 can include an upper portion 152, a lower portion 154, an opening 156 and a strap 158. When the upper portion 152 and lower portion 154 are closed, or engaged/sealed together, the interior of the storage accessory 150 can effectively be weatherproof and/or waterproof, to protect the contents stored within. The strap 158 can be used to secure the lower and upper portions closed and can include a locking mechanism, or element, to prevent unauthorized access to the interior of the storage accessory 150. To allow easier and/or limited access to the interior of the storage accessory 150, a lidded opening 156 can be included. A user can move the lid of the opening 156, to expose the opening and allow the user access to the contents, or interior, of the storage accessory 150. Additionally, the releasable portion of the mounting hardware used to secure the storage accessory 150 to the bicycle 100 can be located in the interior of the storage accessory 150. When locked, or sealed, this arrangement can prevent others from accessing the mounting hardware and prevent unauthorized removal of the storage accessory 150 from the bicycle 100. In one embodiment, the storage accessory 150 and the rear seat accessory 140 are on opposing sides of the seat 120.

Figure 6A:
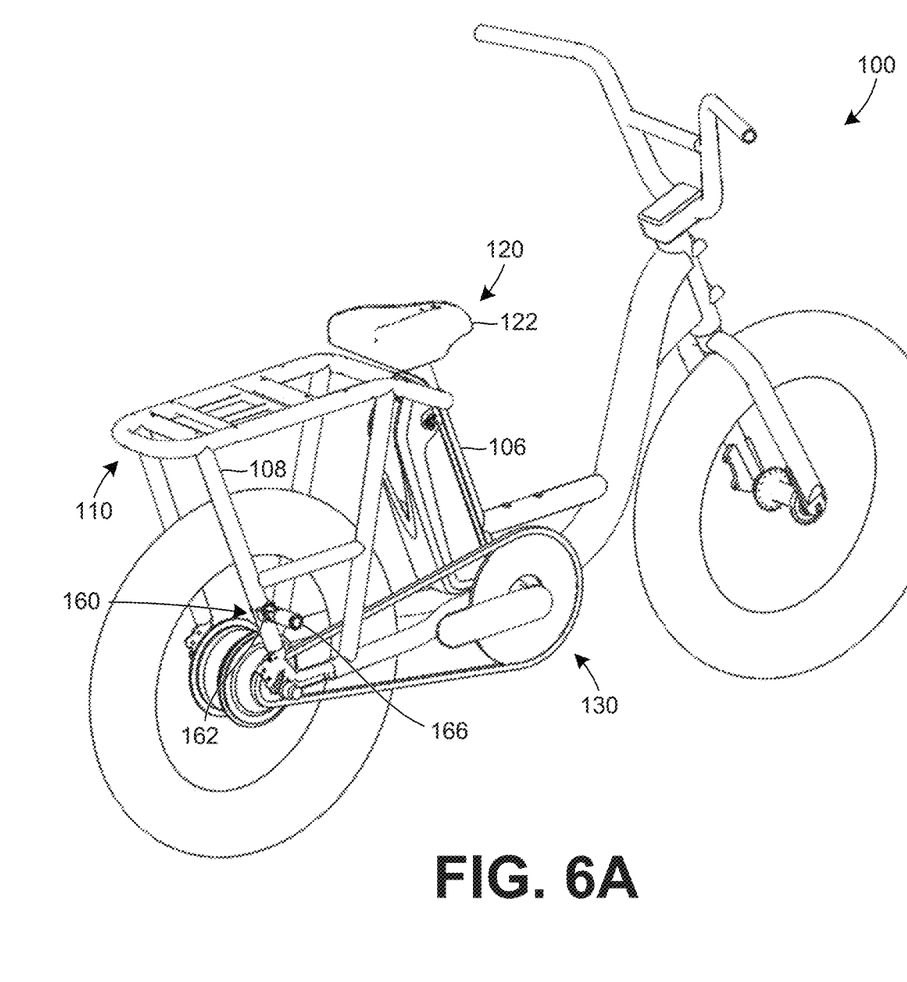
FIGS. 6A-6C illustrate an example footpeg accessory of the bicycle.
Figure 6B:
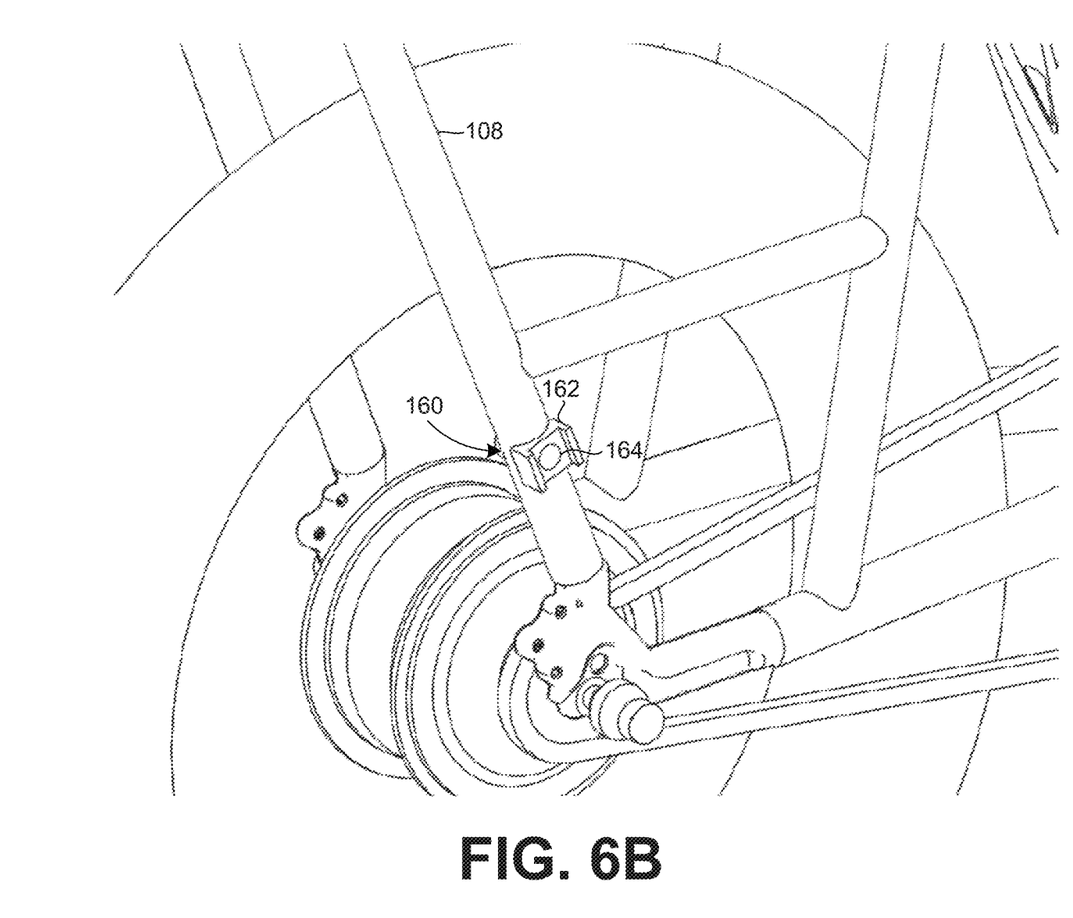
Figure 6C:
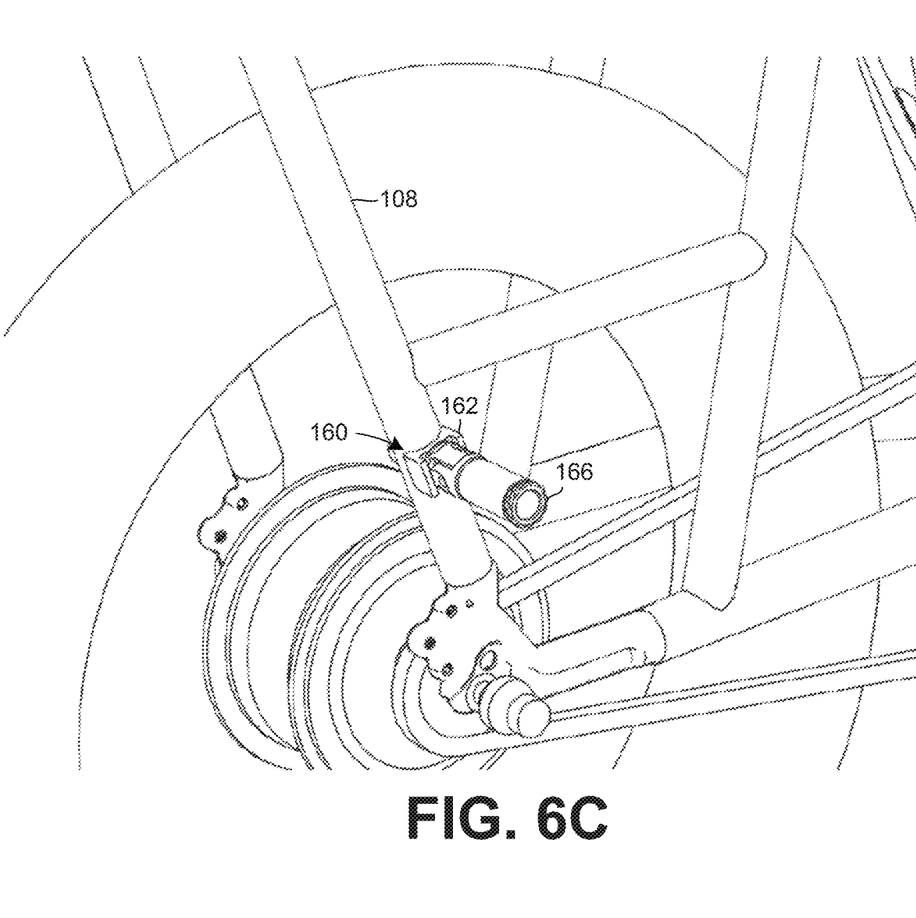

FIGS. 6A-6C illustrate the bicycle 100 with a footpeg accessory 160. The footpeg accessory 160 can provide a place for a rider, such as a passenger sitting on the rear seat accessory 140, to rest their feet. The footpeg accessory 160 includes a bracket 162 that is welded to, integrated with, or attached to an uptube 108 of the frame 102 of the bicycle 100. Alternatively, the bracket 162 can be molded with the uptube 108, such that the bracket 162 and the uptube 108 are a single piece. The uptube 108 can be a portion of the frame 102 that assists in supporting the accessory shelf 110.

The bracket 162 includes an opening 164 into which a footpeg 166 can be inserted or secured. In an example, the opening 164 can be a threaded opening and the footpeg 166 can include a threaded end that can be screwed into the opening 164 to secure the footpeg 166 to the frame 102 of the bicycle 100. In an embodiment, a portion of the footpeg accessory 160, such as the footpeg 166, can be retractable, foldable, or adjustable to allow the footpeg accessory 160 to change configuration, such as from an extended configuration or position to a stowed or a retracted configuration or position, such as shown in FIG. 6C. The footpeg 166 can include a hinge to allow a portion of the footpeg 166 to be rotated up or down to move it into the retracted position. In an example, the footpeg 166 can include a first portion that can be secured to a bracket and a second portion that is hinged or rotatably coupled to the first portion to allow the second portion to be rotated up or down to retract or stow the footpeg 166.

In another example, the opening 164 can be on a side portion of the bracket 162, such that the footpeg 166 can be attached by detents, clips, dovetail joints, tongue and groove, snap fit, the like, or combinations thereof. The footpeg 166 can be retractable, foldable, adjustable, or hingedly attached to the bracket 162. In yet another example, the bracket 162 and the footpeg 166 can be a single piece that can be permanently or removably affixed or attached to the bicycle 100, such as to the frame 102.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

The invention claimed is:

1. A bicycle, comprising:
   a seat being moveable between a first position and second position and having a seating portion;
   an accessory shelf; and
   a rear seat accessory having a seating surface and configured to be coupled to the accessory shelf,
   wherein the seating surface includes a front portion and a rear portion that is higher than the front portion,
   wherein, when the rear seat accessory is coupled to the accessory shelf and the seat is in the first position, the seating portion of the seat is not aligned with the front portion of the seating surface of the rear seat accessory, and
   wherein, when the rear seat accessory is coupled to the accessory shelf and the seat is in the second position, the seating portion of the seat is substantially aligned with the front portion of the seating surface of the rear seat accessory.

2. The bicycle of claim 1, further including a frame and wherein a portion of the frame is the accessory shelf.

3. The bicycle of claim 2, wherein the seat includes a seat post that is extendable from a seat tube of the frame to move the seat between the first position and the second position.

4. The bicycle of claim 2, further comprising a footpeg accessory comprising a bracket and a footpeg, wherein the bracket is affixed to the frame.

5. The bicycle of claim 4, wherein the footpeg includes a threaded end and the bracket includes a threaded opening into which the threaded end of the footpeg is secured.

6. The bicycle of claim 4, wherein the footpeg is movable between a retracted position and an extended position.

7. The bicycle of claim 1, further comprising a securing mechanism to secure the seat at one of the first position or the second position.

8. The bicycle of claim 7, wherein the securing mechanism is a component of the seat.

9. The bicycle of claim 7, wherein the securing mechanism is a component of a frame.

10. The bicycle of claim 7, wherein the securing mechanism is a component of a seat tube of a frame.

11. The bicycle of claim 1, wherein when the seating portion of the seat is substantially aligned with the front portion of the seating surface of the rear seat accessory, a substantially continuous seating surface is formed from the seating portion of the seat to the rear portion of the seating surface of the rear seat accessory.

12. The bicycle of claim 1, wherein the accessory shelf comprises at least one attachment point to permit coupling of the rear accessory seat.

13. The bicycle of claim 12, wherein the rear accessory seat is coupled to the accessory shelf with at least one fastener, at least one threaded fastener, at least one screw, at least nut and bolt, or a combination thereof.

14. The bicycle of claim 1, wherein the rear seat accessory further comprises a strap extending across the seating portion.

15. The bicycle of claim 1, wherein the rear seat accessory includes a rear portion and a front portion, the rear portion being raised relative to the front portion.

16. The bicycle of claim 1, further comprising one or more foot support accessories.

17. The bicycle of claim 16, wherein the one or more foot support accessories includes at least one footpeg, at least one running board, or at least one of both.

18. An electric bicycle, comprising:
a seat moveable between a first position and second position,
wherein the first position is a position relatively closer to pedals of the electric bicycle and the second position is a position relatively farther from the pedals of the electric bicycle; and
a control system that modifies an operational mode of the electric bicycle based on a detected position of the seat,
wherein the operational mode of the electric bicycle includes a manual mode, an assisted mode, and a self-propelled mode, and
wherein the control system changes the operational mode of the electric bicycle to the self-propelled mode when the seat is moved into the first position.

19. The electric bicycle of claim 18, wherein the control system activates a light signaling system of the electric bicycle when the seat is moved into the first position.

20. A bicycle, comprising:
a frame;
a rear shelf that is part of the frame; and
a rear seat accessory mounted to the rear shelf,
wherein the rear seat accessory includes a seating surface, and
wherein the seating surface includes:
a front portion having a first height, and
a rear portion having a second height greater than the first height of the front portion.

21. The bicycle of claim 20, further comprising:
a seat having a seating portion,
wherein, when the seat is in a lowered position, the seating portion of the seat is aligned with the front portion of the seating surface of the rear seat accessory and forms a continuous seating surface from the seating portion of the seat to the rear portion of the seating surface of the rear seat accessory.

* * * * *